United States Patent [19]

Cole

[11] Patent Number: 4,981,225

[45] Date of Patent: Jan. 1, 1991

[54] UNIVERSAL SAFETY NET SYSTEM FOR PALLET RACKS

[75] Inventor: Barry A. Cole, Colchester, Conn.

[73] Assignee: Sinco, Inc., East Hampton, Conn.

[21] Appl. No.: 354,153

[22] Filed: May 19, 1989

[51] Int. Cl.$^5$ .............................................. A47F 5/00
[52] U.S. Cl. ................................... 211/183; 211/180; 211/189; 211/208
[58] Field of Search ............... 211/189, 180, 190, 191, 211/207, 208, 204, 206, 183

[56] References Cited

U.S. PATENT DOCUMENTS

| | | | |
|---|---|---|---|
| 844,687 | 2/1907 | Miller et al. | 211/207 X |
| 3,923,277 | 12/1975 | Perrault et al. | 211/208 X |
| 4,030,611 | 6/1977 | Konstant | 211/191 |
| 4,074,811 | 2/1978 | Filak | 211/191 |
| 4,380,298 | 4/1983 | Harig | 211/204 X |
| 4,502,619 | 3/1985 | Cox | 211/208 X |
| 4,815,613 | 3/1989 | Hollander | 211/191 |

*Primary Examiner*—Robert W. Gibson, Jr.
*Attorney, Agent, or Firm*—Chilton, Alix & Van Kirk

[57] ABSTRACT

A universal safety net system for a pallet rack employs extension members which are variably adjustable for extending the effective height of the pallet rack support posts. Offset members which include a series of openings for implementing a pre-established offset spacing from the pallet rack are also employed. Adjustable cross brace assemblies are employed to reinforce the offset members and the vertical extender members. Cables are suspended between the offset members and/or extension members to provide a cable framework for supporting the safety net.

18 Claims, 5 Drawing Sheets

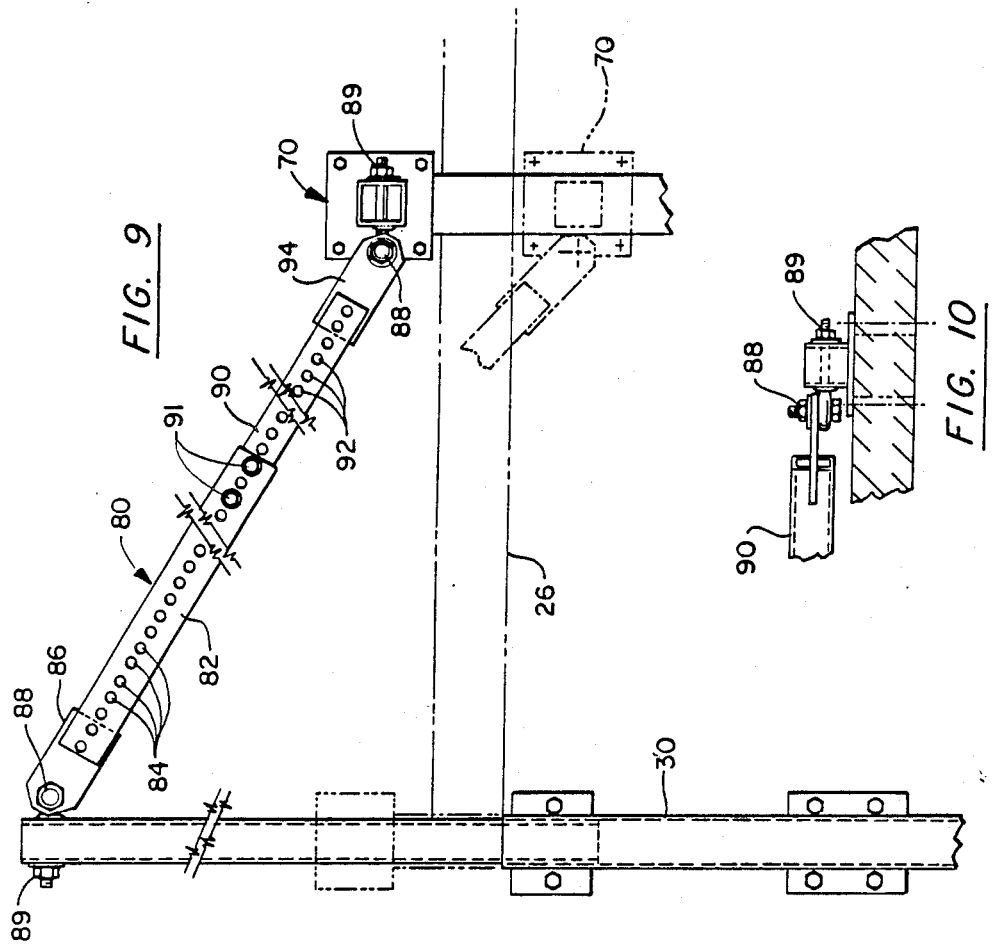
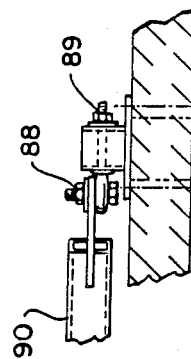
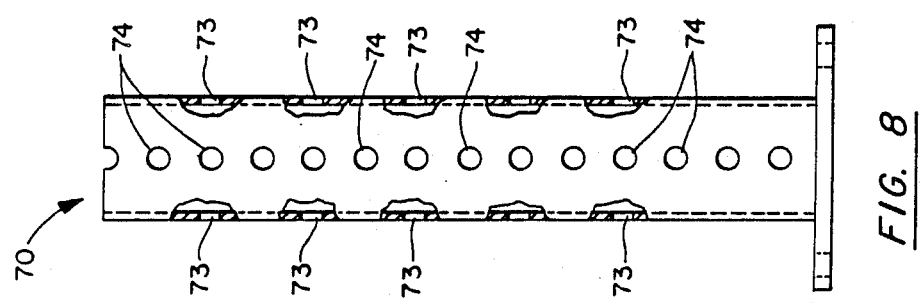

UNIVERSAL SAFETY NET SYSTEM FOR PALLET RACKS

BACKGROUND OF THE INVENTION

This invention relates generally to net systems which are employed as safety barriers. More particularly, the present invention relates to safety net systems which are installed to pallet racks and the like.

Pallet racks have for a number of years provided a primary storage support structure in large warehousing storage and distribution facilities. In highly efficient modernized warehousing operations, forklifts or other vehicles are commonly employed to load and remove loaded pallets from pallet racks. As the size of the facilities has increased, the potential for accidental droppage or improper loading of the pallet racks has also escalated. Many facilities have employed safety netting systems to enhance safety. The safety nets are ordinarily installed at the back of the pallet racks to form a safety barrier to thereby minimize the safety risks from mishandling loads or misloading of the pallet racks.

The safety net systems which have been conventionally employed in connection with pallet racks have tended to be custom installed for the configuration, size and safety level requirements of a given pallet rack. Because pallet rack systems tend to not be standardized in terms of shape, size and load ratings and tend to have different load distribution requirements, providing a safety net system which is adaptable for use with a wide variety of pallet rack systems has proved problematical. In practice, the safety netting is conventionally suspended from cables which are subjected to a high level of tension in order to provide a netting system having sufficient structural integrity when subjected to a load impact. Consequently, the structural framework for the safety netting system requires a substantial structural rigidity in order to properly suspend the netting.

SUMMARY OF THE INVENTION

Briefly stated, the invention in a preferred form is a universal safety system which is especially adapted for installation in connection with a wide range of pallet rack shapes, size and load requirements. The safety system includes at least two extension assemblies for extending the effective vertical height of rear support posts of the pallet rack. Each extension assembly includes a tube and a pair of mounting plates fixed to one side of the tube. An extender boom has an extension end. The boom is slidably received in the tube and longitudinally positionable at a plurality of positions. Bolts are inserted through openings in the boom and tube for fixing the length of the extension assembly Cables are suspended between the struts.

Offset members may also be mounted to the booms for generally transverse extension thereto. Cables connect with the offset members to form a cable framework for the safety net. The cable framework may extend generally above the upper load beam of the pallet rack and in generally offset relationship to the pallet rack. An adjustable cross brace for bracing the offset members comprises a female member and a male member which is slidably received in the female member for variable longitudinal positioning therewith. Bolts or other fasteners are employed for adjustably fixing the length of the cross brace. The cross brace connects to the offset members in generally diagonal relationship.

In one embodiment of the invention, at least four offset members are employed. The offset members include opposed sides having aligned pairs of openings. Some of the openings have enlarged diameters in relationship to the other openings. An eye-bolt and bolt assembly is connected through enlarged openings for connecting the cross brace to the offset members to prevent collapse of the support structure for the safety net. A colinear set of aligned openings of the offset members provides a means where a pre-established offset distance for the cable framework for the safety net may be suitably implemented by connecting the cables through one of the selected aligned pairs of openings.

An object of the invention is to provide a new and improved safety net system for a pallet rack which is adaptable for installation for a wide range of pallet rack configurations, sizes and load configurations.

Another object of the invention is to provide a new and improved universal safety net system which is easily mountable to a large number of pallet rack systems.

A further object of the invention is to provide a new and improved universal safety net system which is adaptable for use in connection with a wide range of pallet racks and provides a support system having a high level of structural integrity.

Other objects and advantages will become apparent from the drawings and the specification.

BRIEF DESCRIPTION OF THE DRAWINGS

FIG. 8 is an enlarged side view, partly broken away, of a portion of the safety net system of FIG. 4;

FIG. 9 is an enlarged fragmentary side elevational view, partly broken away and partly in phantom, of a portion of the safety net system of FIG. 4; and FIG. 10 is a fragmentary top plan view of the safety net system of FIG. 6.

DETAILED DESCRIPTION OF THE INVENTION

Figure 1:
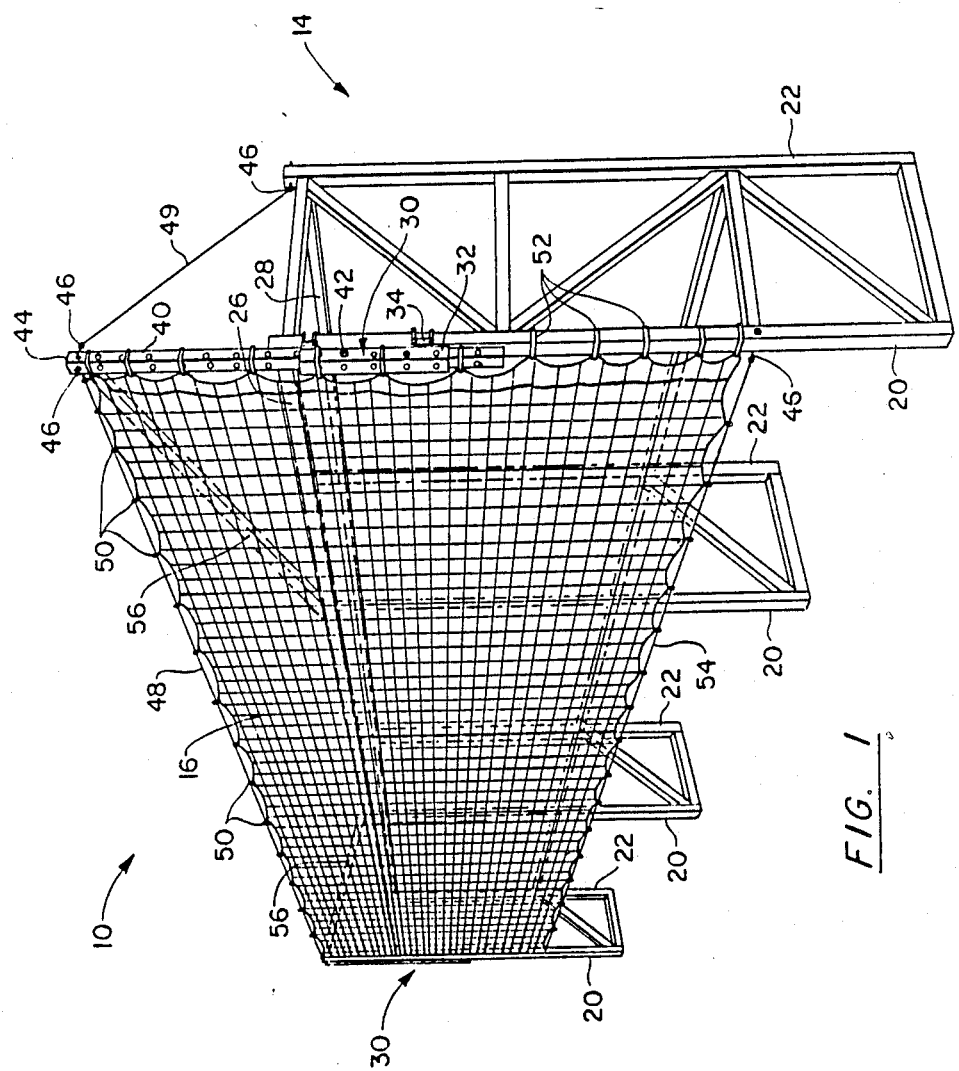
FIG. 1 is a perspective view of a universal safety net system installed on a pallet rack in accordance with the present invention.

With reference to the drawings wherein like numerals represent like parts throughout the figures, a universal safety net system, which may assume numerous forms, is designated generally by the numeral 10 in FIG. 1. A second form of the universal safety net system is designated generally by the numeral 12 in FIG. 4. Both of the safety net systems are mounted to a pallet rack designated generally by the numeral 14. The universal safety net system employs a safety net 16 which functions as a safety barrier to prevent the misloading and/or accidental dislodgement of loads onto or off of a pallet rack. The safety net systems 10 and 12 are adapted for mounting to a wide range of pallet rack shapes, sizes and load configurations. Accordingly, rack 14 is intended to be illustrative of numerous forms and types of pallet racks and other racks to which the safety system has application. The safety net system likewise may assume numerous configurations other than the specific illustrated safety net systems 10 and 12.

Figure 4:
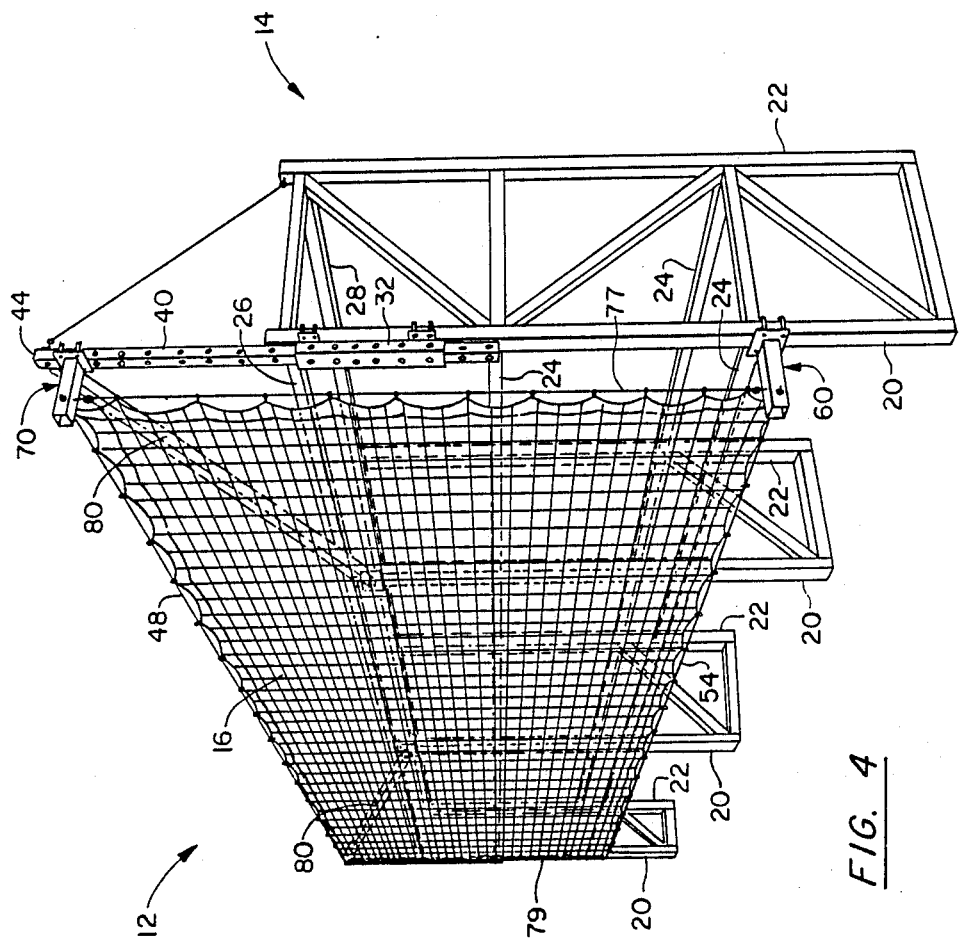
FIG. 4 is a perspective view of another embodiment of the universal safety net system installed on a pallet rack in accordance with the present invention.
Figure 7:
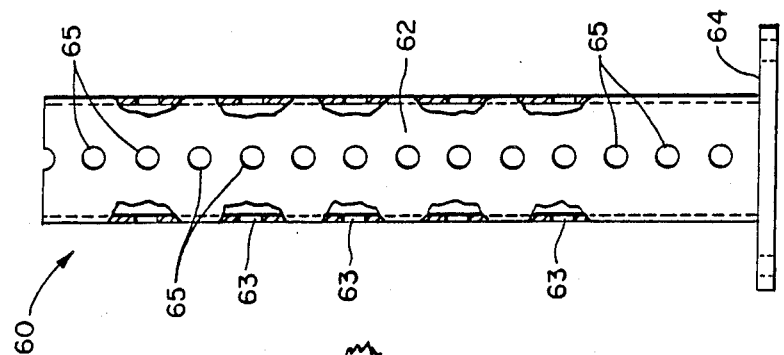
FIG. 7 is an enlarged side view, partly broken away, of a portion of the safety net system of FIG. 4.

With reference to FIGS. 1 and 4, a prototypical pallet rack 14 comprises longitudinally spaced pairs of rear and front upright support posts 20 and 22. While the support posts need not be identical for purposes of describing the invention, the upright support posts 20 and 22 will be treated as substantially identical throughout the longitudinal expanse of the pallet rack. Longitudinally extending load beams 24 are supported by the support posts. Pallets are ordinarily loaded crosswise onto the support beams from front to rear. The uppermost rear load beam 26 and uppermost front load beam 28 also ordinarily receive pallets, and because of their upper vertical disposition, often represent the rack location having the greatest potential for misloading. Various other bracing members may be provided to reinforce and stabilize the pallet rack 14.

Figure 3:
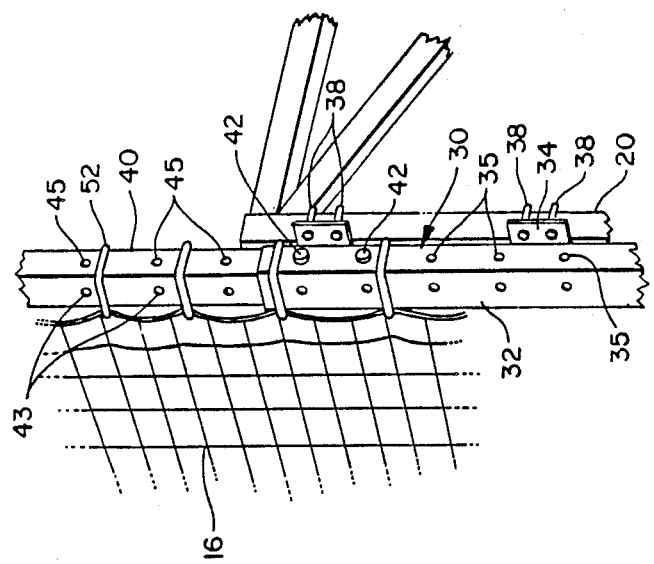
FIG. 3 is an enlarged fragmentary perspective view of the universal safety net system of FIG. 1.
Figure 2:
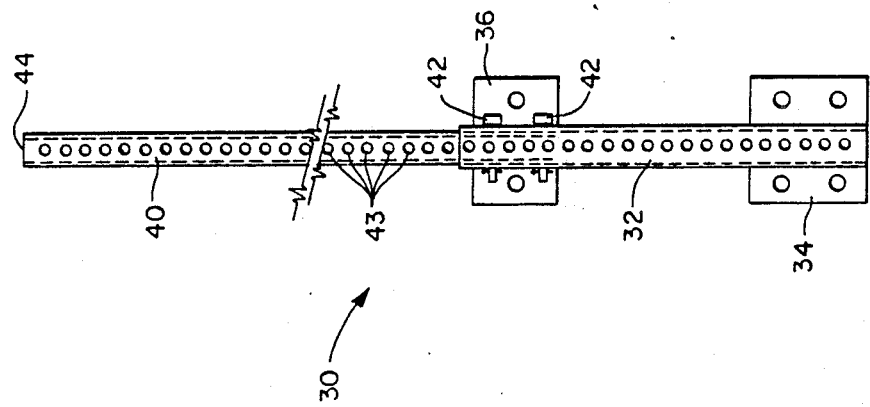
FIG. 2 is an enlarged side elevational view, partly broken away and partly in phantom, of a portion of the safety net system of FIG. 1.

With reference to FIGS. 1, 2, and 3, an expandable extension unit 30 is mounted to two of the rear support posts 20 at an upper location to provide an expandable support framework for extending the safety net 16 above the upper load beams 26 and 28. Extension unit 30 comprises a tubular steel female socket 32 which in one embodiment has a 2 ½ inch square section. Opposing sides of the socket have aligned longitudinally spaced series of apertures 35. Rectangular plates 34 and 36 are welded to one side of the tube 32 at longitudinally spaced positions proximate to the socket ends. The plates 34 and 36 have aligned openings which are dimensioned and spaced to receive U-bolts 38 for mounting the socket 32 in flush relationship against the support posts 20 upon threadably tightening nut assemblies against the mounting plates.

An elongated tubular extension boom 40 is slidably received in the tube 32. Each of the opposing sides of the boom 40 have a longitudinally spaced series of apertures 43 and 45. Apertures 45 are alignable with the corresponding series of apertures 35 of the socket. A pin or bolt 42 may be inserted through aligned pairs of apertures 35 and 45 to fix the extension length of the extension unit. The height of the upper end of the extension boom may be suitably adjusted for a given application prior to insertion and secured by means of the bolt 42 inserted through the aligned apertures. The length of the extension boom 40 is ordinarily limited so that the maximum extent does not unduly compromise the structural rigidity of the net supporting frame. For example, the maximum extent of the boom 40 may be six feet above the top of the socket tube 32. The extension unit 30 is mounted at an upper location of the support post so that the remote boom end 44 is spaced above the uppermost load beam 26. A minimum of 4 inches boom/socket overlap is ordinarily required.

Eye-bolts 46 are mounted through upper apertures 45 of the extension boom proximate remote end 44. A cable 48 is suspended between the opposing eye-bolts and forced to a taut condition. A diagonal reinforcing cable 49 may also be connected between an eye-bolt 46 at the top of the extension boom and an eye-bolt 46 which is anchored at a top location of the front support posts 22. The safety net 16 is suspended from the cable by S hooks 50 or safety ties. The sides of the net are secured by ties 52 which are vertically spaced along the extension boom and the support post, as illustrated in FIG. 1. A bottom cable 54 may also be suspended between eye-bolts 46 which are anchored at a lower location to the support posts.

It should be appreciated that the safety net is maintained in a substantially planar configuration. The cables require substantial tension to maintain the requisite tautness to support the net. Cross braces 56 are connected between an upper location of the extension boom and an upper location of an adjacent support post to prevent the upper extension booms from collapsing or folding due to the taut condition of the cable 48.

For some installations, it is desirable to suspend the safety net 16 in offset relationship spaced away from the rear of the pallet rack to allow for the overhang or extension of pallets and loads of materials. An offset configuration for the universal safety net system 12 is illustrated in FIG. 4. Naturally, the offset spacing will vary from installation to installation. The safety net system 12 is specifically designed to accommodate a range of such offset spacing requirements.

The safety system 12 employs a lower universal offset member 60 and an upper universal offset member 70. Offset member 60 may be a 2 ½ inch square steel tube 62. Opposing sides of the offset member have aligned equidistantly spaced perforated apertures 63 and 65. A rectangular mounting plate 64 is welded to one end of the tube 62. The plane of mounting plate 64 is perpendicular to the central axis of tube 62. The mounting plate has four corner openings 65 spaced from the plate/tube intersection. The openings 65 are dimensioned and positioned for receiving U-bolts 66. The U-bolts 66 mount around the support posts 20 and are secured by nut assemblies for mounting the offset member 60 to the support post. Upon mounting, the offset support member 60 extends transversely from the pallet rack in a generally horizontal orientation. The apertures 63 and 65 define a multiplicity of offset locations which may be selected for spacing the safety net 16 in the desired offset relationship to the pallet rack. The offset member 60 preferably has a limited longitudinal dimension, such as, for example 14 inches, so that the offset member does not unduly extend from the pallet rack to jeopardize the structural integrity of the net supporting framework.

The upper offset member 70, as best illustrated in FIG. 8, differs from offset member 60, principally with respect to a set of enlarged openings 74 which are somewhat larger than the apertures 73 and 75. The enlarged openings accommodate the mounting bolt of a cross brace assembly. The upper offset member 70 is bolted by U-bolts 66 around the extension boom 40 (or alternatively the support post 20) at an upper location so as to also project in parallel relationship with the lower offset member 60. Eye-bolts 46 are inserted through selective apertures 65 and 75 of the respective upper and lower offset members and fastened for suspending cables 77 and 79 in generally vertical orientation as well as upper and lower cables 48 and 54 in a generally horizontal orientation.

Figure 6:
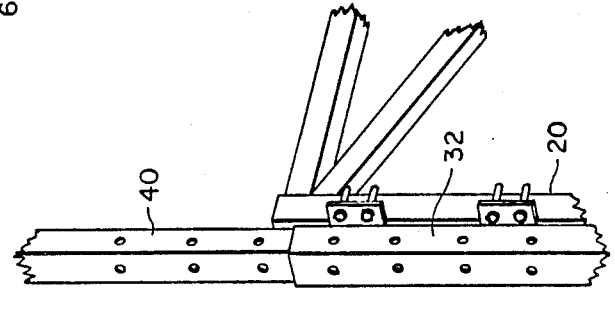
FIG. 6 is an enlarged fragmentary perspective view of the safety net system of FIG. 4.
Figure 5:
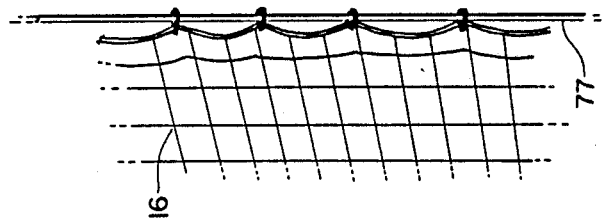
FIG. 5 is an enlarged fragmentary perspective view of the safety net system of FIG. 4.

It should be appreciated that at longitudinally spaced locations of the pallet rack a second set of upper and lower offset members is also mounted. Eye-bolts 46 are also mounted to the second set of offset members to suspend the upper cable 48, the lower cable 54, and the vertical cable 79 to provide a cable support frame. The safety net 16 is suspended from the cables in the offset relationship illustrated in FIGS. 4-6.

A universal cross brace 80 is employed to brace the offset member 70 and the extension unit 30 to prevent bending or collapse of the support framework so that the requisite tautness of the cables may be maintained. With reference to FIGS. 4, 9, and 10, cross brace 80 comprises a female socket member 82 having a series of colinear longitudinally spaced openings 84. The openings 84 are substantially identical, equidistantly spaced openings. A connector plate 86 is welded to one end of the female member 82 and projects longitudinally therefrom. The connector plate 86 has an aperture which receives a hex head bolt 88 for pivotally mounting one end of the connector plate to a shoulder-type eye-bolt assembly 89 fastened to the offset member 70.

A tubular male extension member 90 has a series of colinear openings 92 which are alignable with the openings 84. The male extension member is slidably receivable and positionable in the female socket member 82 to provide a longitudinally adjustable extension. The length of the cross brace is fixed by fastening bolts 91 which are inserted through aligned openings 92 and 84. A connector plate 94 is welded at the outer end of the extension member 90. The connector plate 94 also has an aperture to receive a bolt 86 which is fastened to an eye-bolt assembly 88 for pivotally mounting the connector plate 94 to a second offset member 70. The second offset member 70 is mounted at an upper location of a second support post 22 to provide the bracing function. The eye-bolt assemblies 89 are connected to the offset members through the enlarged openings 74.

A feature of the universal safety net system resides in the ability to install a safety net system on a wide variety of pallet racks by appropriately selecting a minimal number of the universally adjustable assemblies, e.g., extension unit 30, offset members 60 and 70, and cross brace 80, and adjusting for the dimensions to a given application. Consequently, the universal safety net system obviates the requirement for custom manufactured framework components. A safety net system may be readily installed without elaborate design or planning requirements by implementing on-site adjustments at the time of installation. Moreover, the universal safety net system provided by the invention makes possible a structural framework of sufficient rigidity that the integrity of the net safety barrier is sufficient to withstand substantial load impacts.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

WHAT IS CLAIMED IS:

1. A safety system for a pallet rack having a plurality of upright posts supporting horizontally disposed load beams comprising:
   at least two extension means for extending the effective vertical extent of a post, each said extension means comprising:
   a mounting tube;
   a pair of longitudinally spaced mounting plates fixably mounted to said tube;
   an extender boom having an extension end and slidably receivable in said tube and longitudinally positionable at a plurality of positions therewith;
   adjustment means for adjustably fixing the distance of said extension end from said mounting tube;
   cable means comprising a cable suspended between said booms; and
   mounting means for mounting said tube mounting plates to rack posts so that said cable is suspended above said posts.

2. The safety system of claim 1 wherein said mounting tube defines a first multiplicity of spaced openings, said extender boom defines a second multiplicity of spaced openings, and said adjustment means comprises a fastener insertable through alignable openings of said first and second multiplicities.

3. The safety system of claim 1 further comprising offset members mounted to said booms for generally transverse extension thereto, said cable means connecting said offset members.

4. The safety system of claim 3 further comprising adjustable brace means for bracing said offset members, said brace means comprising a female member, a male member slidably received in said female member for variable longitudinal positioning therewith and fastening means for adjustably fixing the length of said brace means.

5. The safety system of claim 4 further comprising brace mounting means for connecting said brace means to a said offset member in generally diagonal relationship.

6. The safety system of claim 1 further comprising net means suspended from said cable for forming a safety barrier upon mounting said extension means to one side of said pallet rack.

7. The safety system of claim 5 wherein said brace mounting means comprises a bolt and an eye-bolt, said bolt extending through said eye bolt and an end portion of said adjustable brace means.

8. The safety system of claim 1 further comprising adjustable brace means for bracing at least one said extension means, said brace means comprising a female member, a male member slidably received in said female member for variable longitudinal positioning therewith and fastening means for adjustably fixing the length of said brace means.

9. A safety system for a pallet rack having a plurality of upright posts supporting horizontally disposed load beams comprising
   at least one offset means for offsetting the effective attachment position of a post, said offset means comprising:
   an elongated tubular member having two pairs of opposed sides, said opposed sides defining a multiplicity of aligned pairs of apertures;
   a mounting plate mounted at one end of said tubular member, the plane of said plate being perpendicular to the central longitudinal axis of said tubular member, said plate defining two aligned pairs of openings;
   mounting means for mounting at least one mounting plate to an upright support post for generally horizontal projection of said tubular member from said post; and
   cable means comprising a cable and connecting means for connecting said cable to said offset means through selected aligned pairs of apertures, so that said cable is suspended in offset relationship to said post.

10. The safety system of claim 9 comprising four offset means, said cable means suspended from said offset means so as to generally form a cable framework offset from said support posts.

11. The safety system of claim 9 wherein said opposed sides define an aligned set of openings having an enlarged diameter and an aligned set of openings having a reduced diameter.

12. The safety system of claim 11 further comprising adjustable brace means for bracing at least one offset means and brace connecting means for connecting said adjustable brace means to a said offset means, 13. The safety system of claim 12 wherein said brace connecting means connects through said enlarged openings.

14. The safety system of claim 12 wherein said adjustable brace means comprises a pair of elongated tubular members.

15. A safety system for a pallet rack having a plurality of upright posts supporting horizontally disposed load beams comprising:
 at least one extension means for extending the effective vertical extent of a post, said extension means comprising:
  a mounting tube;
  a pair of longitudinally spaced mounting plates fixably mounted to said tube;
  an extender boom having an extension end and slidably receivable in said tube and longitudinally positionable at a plurality of positions therewith;
  adjustment means for adjustably fixing the distance of said extension end from said mounting tube;
 mounting means for mounting said tube mounting plates to rack posts so that said extension ends are disposed above said posts;
 an offset member mounted to each said boom for generally transverse extension thereto, said at least one offset member defining a plurality of aligned openings; and
 at least one expandable brace means connecting an offset member for bracing said offset member and comprising a pair of tubular members which are slidably positionable for adjusting the length of said brace means to thereby brace said offset member at a pre-determined position.

16. The safety system of claim 15 comprising two extensions means, two offset members and two expandable brace means.

17. The safety system of claim 16 further comprising two lower offset members mountable to two support posts, each said lower offset member defining a plurality of openings.

18. The safety system of claim 17 further comprising cable means for forming a cable support frame, said cable means connecting through selected openings of said offset members to form a frame which is positioned in offset relationship to said support posts and extends above said load beams.

* * * * *